United States Patent [19]

Fukai et al.

[11] 3,900,882

[45] Aug. 19, 1975

[54] PHOTOCONDUCTOR ELEMENT

[75] Inventors: Masakazu Fukai, Nishinomiya; Shinji Fujiwara, Toyonaka; Hiroyuki Serizawa, Katano; Osamaru Eguchi, Higashiosaka; Yukimasa Kuramoto, Takarazuka; Takao Chikamura, Katano, all of Japan

[73] Assignee: Matsushita Electric Industrial Co., Ltd., Kadoma, Japan

[22] Filed: Mar. 29, 1974

[21] Appl. No.: 456,240

[30] Foreign Application Priority Data

| | | |
|---|---|---|
| Mar. 30, 1973 | Japan | 48-37179 |
| Aug. 7, 1973 | Japan | 48-88025 |
| Sept. 18, 1973 | Japan | 48-105733 |

[52] U.S. Cl. .......... 357/30; 357/31; 357/61; 357/16

[51] Int. Cl. .......... H01l 15/00

[58] Field of Search .......... 357/30, 31, 61, 16

[56] References Cited

OTHER PUBLICATIONS

Kohn et al., IEEE Transactions On Electron Devices, Vol. ED-16, No. 10, Oct. 1969, pp. 885-890.

*Primary Examiner*—Martin H. Edlow
*Attorney, Agent, or Firm*—Stevens, Davis, Miller & Mosher

[57] ABSTRACT

This invention relates to a photoconductor element primarily consisting of $(Zn_{1-y}\ Cd_y\ Te)_{1-z}\ (In_2\ Te_3)_z$, wherein $o < y < 1$, $o < z < 1$, or a photoconductor element comprising hetero-junction of material primarily consisting of $Zn_{1-x}\ Cd_x\ S$, wherein $o < x < 1$ and material primarily consisting of $(Zn_{1-y}\ Cd_y\ Te)_{1-z}$ $(In_2\ Te_3)_z$ wherein $o < y < 1$, $o < z < 1$, which has a high light sensitivity over entire visible light range particularly in blue range and which is suitable for a target of a color image pickup tube.

6 Claims, 8 Drawing Figures

PHOTOCONDUCTOR ELEMENT

The present invention relates to the arts of a photoconductor element and a target of an image pickup tube.

The materials CdS, CdSe and mixed crystal thereof have been frequently used as photoconductor elements. Although these materials have high sensitivity, they have high level of dark current and show slow light response. As for the spectrum sensitivity, they exhibit high sensitivity in the vicinity of wavelengths corresponding to respective band gap energies but show low sensitivity below and above those wavelengths and they do not show sensitivity over entire range of visible light.

As the practical targets for the image pickup tubes, antimony trisulfide ($Sb_2S_3$) target, lead monoxide (PbO) target, silicon (Si) target and cadmium selenate (CdSe) target have been well known. However, the $Sb_2S_3$ target has a low light sensitivity and frequently produces after image. The PbO target is expensive in its cost because of complex manufacturing process included and shows a low photo-electric sensitivity at red color. The Si target is liable to produce white scratch on its image plane due to the fact that the wafer is of single crystal, and has a poor resolution because p-n junctions are formed in an array by integrated circuit technology. The CdSe target, although it has a high sensitivity and a low level of dark current, exhibit somewhat high amount of lag-image.

In general, since the target for the color television image pickup tube shows lower sensitivity at blue or short wavelength than at green or red color, the overall sensitivity of the color television image pickup tube depends upon the sensitivity at blue color. For this reason, for the target of the color television image pickup tube it has been desired to obtain a target which exhibits a high sensitivity over entire range of visible light, particularly at blue color. Particularly, when the target is to be used in two-tube or singletube type color television image pickup tube, if the sensitivity for red color is too high with respect to the sensitivity for blue color the blue signal is shaded by the red signal and cannot be taken out. In order to avoid this inconvenience it is necessary to cut down the sensitivity at red color by a suitable filter or the like. Accordingly it is desired to have a photoconductor element for the target having a spectrum characteristic which eliminate the need to cut down the sensitivity at red color by the filter or the like. Since the dark current increases as the environmental temperature rises, it should be maintained as low as possible in order to stabilize black level.

It is, therefore, an object of the present invention to provide a target for an image pickup tube which shows a high photo-electric sensitivity at blue color and has a fast light response and a low level of dark current.

Figure 1:
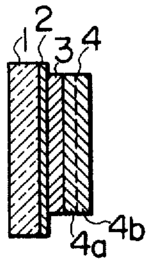
FIG. 1 is a cross-sectional view illustrating an example of photoconductor elements of the present invention.

Referring to FIG. 1, a first layer of $Zn_{1-x}Cd_xS$ film 3, wherein $0 < x < 1$, and a second overalying layer of $(Zn_{1-y}Cd_yTe)_{1-z}(In_2Te_3)_z$ film 4, wherein $O < y < 1$ and $0 < z < 1$, are formed by evaporation on a transparent conductive film 2 formed on a glass substrate 1, so that the films 3 and 4 establish a hetero-junction. Light is directed from the side of the glass substrate 1. The light having the wavelength corresponding to a band gap energy of the film 3, that is, the wavelength shorter than that at an absorbing end, is absorbed at a point very close to the surface. Therefore, in order to improve the spectrum sensitivity at short wavelength, the band gap energy of the film 3 may be brought to a limit value for the short wavelength of the required spectrum sensitivity so that the light of short wavelength entered from the side of the glass substrate 1 can be transmitted to the high sensitivity film 4 without being absorbed by the film 3. However, even when the light is efficiently transmitted to the film 4, the efficiency of photoelectric conversion will be lowered if there exist many recombination centers in the interface of the films 3 and 4. Therefore, the interface between the films 3 and 4 should have an excellent crystal property, a low surface level due to defects and a small amount of recombination centers. To this end, it is required that the film 3 resembles to the film 4 in their lattice constants, crystalline structure and coefficients of thermal expansion. Thus, since those lights transmitted to the film 4 which have longer wavelength than that corresponding to the band gap energy of the film 4, can be transmitted without being absorbed by the film 4, this wavelength defines a limit for the long wavelength of the spectrum sensitivity. The band gap energies for the films 3 and 4 may be changed by varying the values $x$, $y$, $z$ of the composition.

Although the photoconductor element having hetero-junction structure consisting of the films 3 and 4 has been described hereinabove, a photoconductor element consisting solely of the film 4 can exhibit considerable improvement in its characteristics to compare with those of prior art $Sb_2S_3$ vidicon, as will be described later.

In case of the photoconductor element, a voltage is applied between the transparent conductive film 2 and a silver paste electrode (not shown) formed on the film 4 to apply a voltage to the films 3 and 4. In case of the target for the image pickup tube, the film 4 is scanned by electron beam to apply a voltage to the films 3 and 4 in cooperation with a potential applied to the transparent conductive film 2. In this arrangement the voltage distribution between the films 3 and 4 should be such that more voltage is applied to the film 4, because if an electric field across the film 4 is not sufficient to cause free carriers generated on a surface of the film by light to travel, the carriers will be trapped before they reach the other end so that the light sensitivity will be lowered by the amount corresponding to the trapped carriers and a transient response to the light will be very slow due to the trapped carriers resulting in overshooting and afterimage in case of the image pickup tubes. Accordingly, it is necessary that the film 3 has somewhat lower resistance than the film 4 has with respect to longitudinal direction. To this end, the thicknesses and specific resistances of the films 3 and 4 should be adjusted to appropriate values. The specific values of the films 3 and 4 can be varied depending upon the values of $x$, $y$ and $z$ of the composition and the evaporation condition. When the element is to be used as a target for the image pickup tube, the specific resistances of the film 4, both in longitudinal and lateral directions, must be considerably high in order to cause the charges to be stored in the capacity of the film, to reduce the dark current and to improve the resolution.

It is necessary to reduce the trapping in the photoconductor element in order to increase the response speed to the light. In case of the target for the image pickup tube, the lag-image will increase as the capacitance of the photoconductive element becomes excessive. On the contrary, when the capacitance is too small a time constant determined by the capacitance and a parallel equivalent resistor becomes shorter than a repetition period for the scan by electron beam so that the light signal is not adequately stored resulting in the reduction of the sensitivity. For this reason the thickness of the film 4 should be properly selected.

Before illustrating several examples of the photoconductor elements in accordance with the present invention, a method of measuring characteristics of the photoconductor elements, which are common to all examples, will be described.

Figure 2:
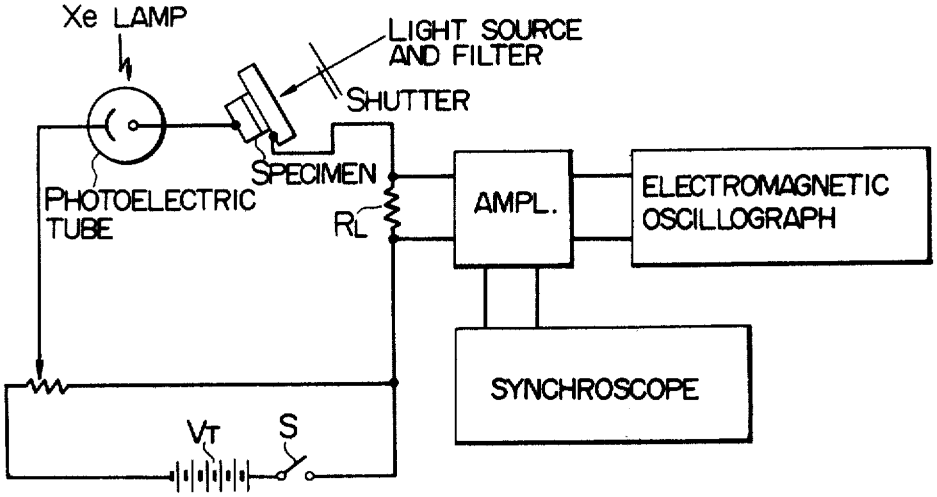
FIG. 2 shows a circuit diagram for measuring a light response characteristic of a photoconductor element.

Method of Measuring Characteristics:

1. Characteristic of photoconductor element:

A voltage was applied across the transparent conductive film 2 and the silver paste electrode formed on the film 4 to measure spectrum characteristic, dark current, light current and light response speed by a measuring instrument shown in FIG. 2.

Spectrum characteristic: p a. An interference filter having a half-amplitude period of 10 – 20 $m\mu$ and a halogen lamp having a color temperature of 3400°K were used to measure the light current at an interval of 20$m\mu$. The amount of light from a light source through a filter to a sample was measured by a thermopile. The longitudinal axis of the spectrum characteristic chart was scaled by equi-energy sensitivity.

b. Dark current and light current: Current-voltage characteristic and light current-intensity characteristic were measured by an electrometer Model 610C manufactured by Keithley Co.

c. Light response characteristic: The light response of the image pickup tube is principally different from the photoconduction response of the element. For a picture element of an image pickup tube scanned by electron beam, an equivalent circuit without electron beam scan was prepared to evaluate the image pickup tube characteristic by an element. FIG. 2 shows schematic diagram thereof wherein a photo-electric tube was turned on and off by light pulses having a repetition rate of 60 Hz and pulse width of 2 $\mu$.sec so that electron beam is caused to re-scan a picture element at 60 Hz. The element was illuminated by a halogen lamp of 3400°K through a filter, and the light response was measured by a camera shutter.

2. Characteristics of the Image pickup Tube:

a. Dark current and light current: A positive voltage was applied to the transparent conductive film while the tube was scanned by electron beam and signal current was taken out and measured.

b. Lag-image, residual-image and after-image: The lag-image is a transient characteristic of the image pickup tube and it is defined by percent value of the signal current remaining 50 m sec. after the switching from light condition to dark condition. The residual-image is defined to be a long time lag-image. The after-image is defined by the quenching time for the after-image as measured by a video monitor when the image pickup tube was operated under a standard image pickup condition for a specified time period and then it was operated to pick up uniformly white background.

The examples of the photoconductor elements of the present invention will now be described.

EXAMPLE 1

Method of preparation: Referring to FIG. 1, masses of ZnS and CdS are placed in separate crucible and evaporated on the transparent conductive film 2 formed on the glass substrate 1 in the form of $Zn_{1-x}Cd_xS$ film 3, at a substrate temperature of 100° – 250°C. to the thickness of 0.02 – 1 $\mu$m to define a first layer. The value x of the $Zn_{1-x}Cd_xS$ film may be varied by controlling the crucible temperature for ZnS and CdS. For example, when ZnS is at 940°C, CdS is at 740°C and the substrate is at 150°C, x is nearly equal to 0.1. Then, solid solution prepared to have a composition of $(Zn_{1-y}Cd_yTe)_{1-z}(In_2Te_3)_z$ is placed in a crucible and evaporated on the first layer in the form of $(Zn_{1-y}Cd_yTe)_{1-z}(In_2Te_3)_z$ film 4 at a substrate temperature of 150° – 250°C, at an evaporation source temperature of 700° – 850°C in the thickness of 1 - 10 $\mu$m, to define a second layer. Thereafter, the assembly is heat treated in vacuum condition at 300° – 700°C for 3 minutes – 3 hours. In this arrangement, the value x was varied while maintaining the values of $y$ and $z$ at fixed values of 0.3 and 0.05, respectively and maintaining the thickness of the film 3 at a fixed value in the order of 0.1 $\mu$m. The results of this experiment will now be described.

Figure 3:
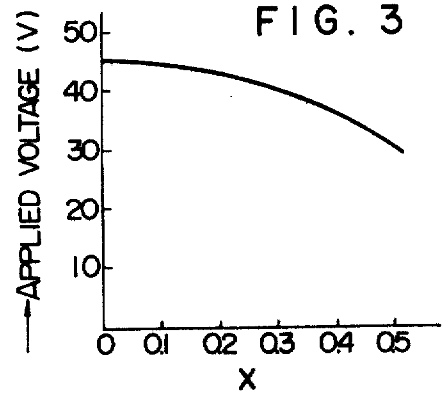
FIG. 3 shows a characteristic curve illustrating a relationship between the value of x for $Zn_{1-x}Cd_xS$ and the applied voltage.

Characteristics of the element:

1. Relationship between dark current and applied voltage: FIG. 3 shows a plot of applied voltage which produces dark current of $5 \times 10^{-10}$ A/mm² for varying value of X. When $X = 0$, the applied voltage is highest, about 45 volts, and as X increases it becomes lower. However, the level of the dark current at low voltage remains unchanged.

Figure 4:
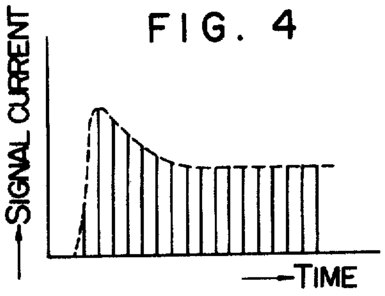
FIG. 4 shows a characteristic curve illustrating rising characteristic of the light response.
Figure 5:
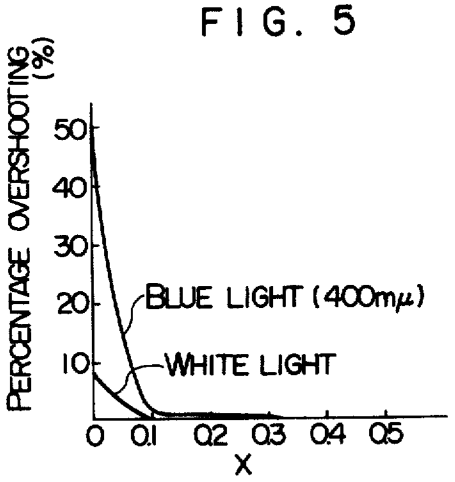
FIG. 5 is a graph showing the relationships between the value of $x$ for $Zn_{1-x}Cd_xS$ and the percent overshooting for blue light and white light, respectively.

2. Relation with light response characteristic: In the rising transient from a moment at which light is impinged on the element to a steady state as measured by the circuit described in connection with the method of measuring characteristics, an overshoot is generally observed as shown in FIG. 4 when the applied voltage is low. As the applied voltage increases, the overshoot decreases and eventually extinguishes and the signal current tends to saturate. The ratio of the overshoot is higher for white light including more red light than for that including more blue light, at a given brightness which maintains the signal current at a fixed level and under a fixed applied voltage. As seen from FIG. 5 the highest ratio of the overshoot is observed when the applied voltage is at 20 volts and X = O, and as X increases it gradually decreases.

Figure 6:
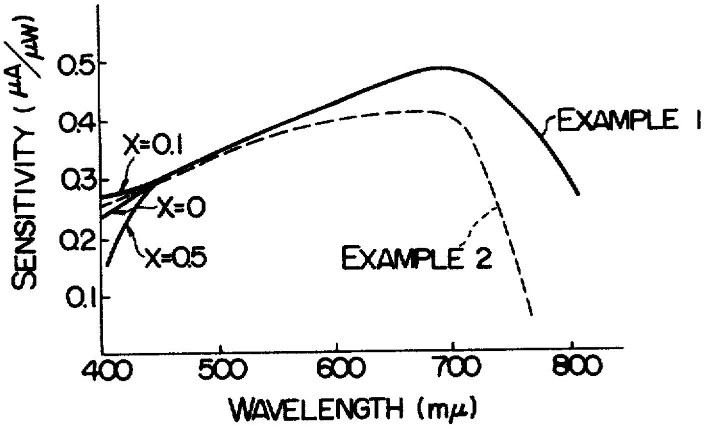
FIG. 6 is a graph showing spectrum characteristic of the photoconductor element.

3. Relation with the sensitivity for blue light: FIG. 6 shows a spectrum characteristic for varying value of X.

The sensitivity for blue light around 400 mμ, when X = 0, is rather low because the overshoot remains a little and exhibits a maximum sensitivity as X increases and the overshoot is completely extinguished. When $x$ is further increased, the sensitivity again decreases because the absorbing end of $Zn_{1-x}Cd_xS$ exceeds 400 mμ and transmission ratio of light is lowered. The absorbing end wavelength λ is 360 mμ when $x = 0.1$, 380 mμ when $x = 0.2$ and 400 mμ when $x = 0.3$. Characteristics of Target of Image Pickup Tube:

Table 1 shows the comparison of the characteristics of a target for two-thirds inch image pickup tube prepared by the element described above, with varying value of $x$. The target voltage was maintained at 20 volts.

Table 1

| X<br>Characteristics | 0 | 0.1 | 0.25 | 0.5 |
|---|---|---|---|---|
| Dark current (nA) | 4 | 3 | 4 | 4 |
| Lag-image (%) | 16 | 8 | 12 | 14 |
| Resolution (number of lines) | 590 | 620 | 620 | 580 |
| Light current (nA/lux) | 230 | 290 | 290 | 280 |
| Blue sensitivity (nA) | 18 | 23 | 21 | 16 |
| After-image | a little* | None | None | None |

*No after-image at target voltage of 30 V. It is seen from the above Table 1 that every characteristic is superior when $x = 0.1$.

EXAMPLE 2

Method of preparation: Referring to FIG. 1, as in the Example 1, $Zn_{1-x}Cd_xS$ film 3 is evaporated to form a first layer, on which $(Zn_{1-y}Cd_yTe)_{1-z}(In_2Te_3)_z$ film 4a is evaporated at a substrate temperature of 150° – 250°C to a thickness of 0.4 – 4 μm and then $(ZnTe)_{1-v}(In_2Te_3)_v$ film 4b is evaporated at a substrate temperature of 150° – 250°C to a thickness of 0.5 – 5 μm to form a second layer. Thereafter, the assembly is heat treated in vacuum at 300° – 700°C for 3 minutes - 3 hours, during which CdTe component of the film 4a is diffused into the film *4b* to render concentration gradient of the CdTe component gentle.

Characteristics:

The example 2, to compare with Example 1, has a lower level of dark current and can reduce the sensitivity for red range without lowering the sensitivity for blue range. With less amount of CdTe content on the side of incident light, the voltage at which the afterimage extinguishes rises and the dark current increase at such a voltage. On the other hand, on the side opposite to the incident light, the dark current tends to increase when the CdTe content is much. In the Example 2, during evaporation process before heat treatment, the concentration gradient of CdTe is conditioned such that more CdTe content is present on the side of incident light while less CdTe content on the opposite side to produce a gentle slope in the concentration distribution so that a target for an image pickup tube which is free of after-image and has a low level of dark current is provided. The limit of the sensitivity for long wavelength is determined by the composition of CdTe in the film *4a* prior to heat treatment and the film thickness. Since after heat treatment the concentration is averaged by diffusion, it is necessary in order to maintain the red sensitivity constant to use a thin film for the film *4a* having a large value for $y$ of the CdTe composition and a thick film for that having a small value of $y$. For example, for the spectrum sensitivity at 760 mμ of 0.1

μA/μw, the film thickness is about 0.6 μm when $y = 0.3$ and the film thickness is about 2.0 μm when $y = 0.1$. When the thickness of the film 4*b* is excessive the voltage at which the after-image extinguishes becomes too high, and when the thickness is too thin the dark current increases. From an overall characteristic viewpoint, a range of 2 – 5 μm for the film thickness is preferable. As for the value of $v$ for the composition of the film 4b, the dark current is in low level when $v$ lies in the range of 0.01 – 0.02, and when $v$ is outside this range the dark current tends to increase to some extent. The Table 2 shows the characteristics of the Example 2 for a sample tube (two-third inch target) with $x$ being fixed at 0.1 while $y$, $z$ and $v$ were varied.

Table 2

| Compositions<br>Characteristics | y = 0.3,<br>z = 0.05<br>v = 0.01 | y = 0.1<br>z = 0.05<br>v = 0.01 | y = 0.3<br>z = 0.05<br>v = 0.03 |
|---|---|---|---|
| Dark current (nA) | 1.0 | 1.5 | 4.0 |
| Lag-image (%) | 12 | 12 | 14 |
| Resolution (number of lines) | 620 | 600 | 580 |
| Red sensitivity (nA) | 130 | 120 | 125 |
| Blue sensitivity (nA) | 23 | 24 | 22 |
| After-image | none | none | none |

It is seen from the above Table 2 that when $v = 001$ the dark current is low and other characteristics are superior.

FIG. 6 shows a comparison of spectrum characteristics for Examples 1 and 2 in the element.

EXAMPLE 3

Figure 7:
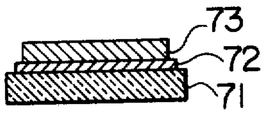
FIG. 7 shows a cross-sectional view of the photoconductor element of the Example 3 in accordance with the present invention.

Method of preparation: Referring to FIG. 7, $(Zn_{1-y}Cd_yTe)_{1-z}(In_2Te_3)_z$ film 73 is evaporated on a transparent conductive film 72 formed on a glass substrate 71, at a substrate temperature of 250° – 350°C to a thickness of 100° - 5000 A. Then evaporation is carried out at reduced substrate temperature of 50° – 200°C to a thickness of 1 – 10 μm. Thereafter, the assembly is heat treated in vacuum or in inert gas atmosphere at 300° – 700°C for 3 minutes - 3 hours. For this arrangement, the results of the experiment for the composition $(Zn_{1-y}Cd_yTe)_{1-y}(In_2Te_3)_z$ with the value $y$ being fixed to 0.3 and $z$ being varied to 0, 0.02, 0.05 and 0.10 will now be described. Characteristics of the element.

Table 3 shows the characteristics.

Table 3

| Z<br>Characteristics | 0 | 0.02 | 0.05 | 0.10 |
|---|---|---|---|---|
| Dark current (A/mm²) | $25\times10^{-11}$ | $9\times10^{-11}$ | $8\times10^{-11}$ | $15\times10^{-11}$ |
| Lag-image (%) | 30 | 13 | 13 | 25 |
| Spectrum sensitivity | FIG.8(A) | FIG.8(B) | FIG.8(C) | FIG.8(D) |

Figure 8:
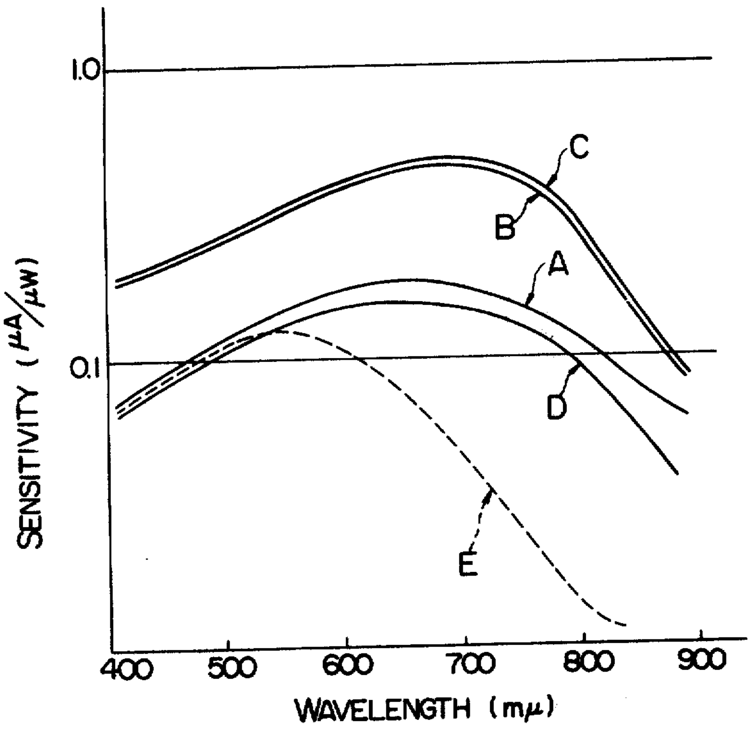
FIG. 8 is a graph showing the spectrum characteristic of the photoconductor element of the Example 3 in accordance with the present invention.

The light response speed is represented by lag-image, that is, the percentage of remaining signal current 50 m sec. after shutting of the light. The applied voltage is at 15 volts. FIG. 8 shows spectrum sensitivity characteristics in which (A) is for $(Zn_{1-y}Cd_yTe)_{1-z}(In_2Te_3)_z$ with $y = 0.3$, $z = 0$, (B) is for $y = 0.3$, $z = 0.02$, (C) is for $y = 0.3$, $z = 0.05$ (D) is for $y = 0.3$, $z = 0.1$ and (E) is for a prior art $Sb_2S_3$ vidicon. It is seen from the Table 3 and FIG. 8 that the composition including 2 - 5 percent of $In_2Te_3$ is preferable as a photoconductive element of a target for an image pickup tube and can provide low dark current, fast light response speed and high spectrum sensitivity. Characteristic of target of image pickup tube: Table 4 shows the characteristics of the target of 1 inch image pickup tube prepared from the above photoconductor element, in comparison with those of prior art vidicon.

Table 4

| Image pickup tube Characteristics | Sample target | $Sb_2S_3$ Target |
|---|---|---|
| Dark current (nA) | 13 (15 V) | 20 (35 V) |
| Sensitivity (μA/lm) | 3500 | 310 |
| Lag-image (%) (after 50 m sec.) | 13 | 25 |
| Residual-image (sec.) (10 lux. 1 min. illumination) | None | 55 |
| After-image (sec.) (10 lux. 1 min. illumination) | None | 37 |
| Resolution (number of lines) | 750 | 750 |

It is seen from the above Table 4 that the sample target is superior to the $Sb_2S_3$ target in its respective characteristics. Furthermore the target having similar characteristics is obtainable when InTe, simple substance of In, $InCl_3$ or the like is mixed, instead of $In_2Te_3$, with $Zn_{1-y}Cd_yTe$.

The Example 3 is somewhat inferior to the Examples 1 and 2 in the blue sensitivity and the response speed.

Advantage of the Invention

The Table 5 shows the Comparison of the characteristics of a target in accordance with the present invention and those for various prior art 1 inch image pickup tube targets.

Table 5

| Target Characteristics | $Sb_2S_3$ Target | Si Target | PbO Target | Sample target (x=0.1 y=0.3 z=0.05) |
|---|---|---|---|---|
| Target voltage (V) | 35 | 15 | 40 | 25 |
| Dark current (nA) | 20 | 15 | 0.3 | 4 |
| Sensitivity (μA/lm) | 300 | 3400 | 380 | 3850 |
| Blue sensitivity (400 mμ μA/μw) | 0.05 | 0.1 | 0.15 | 0.27 |
| Lag-image (%) (Signal current 200 nA, after 3 fields) | 25 | 15 | 3 | 15 |

It is seen from the above Table 5 that the target in accordance with the present invention has a high light sensitivity, particularly in blue sensitivity, to compare with the prior art targets. Accordingly it is suitable for use as a target for monochromatic or color image pickup tube as well as exposure meter, illumination meter, light detector for electronic photography or the like.

What is claimed is:

1. A photoconductor element primarily consisting of $(Zn_{1-y}Cd_yTe)_{1-z}(In_2Te_3)_z$, wherein $0 < y < 1, 0 < z < 1$.

2. A photoconductor element as defined in claim 1, wherein said element consists of hetero-junction having a first layer of a substance primarily consisting of $Zn_{1-x}Cd_xS$, wherein $O < x < 1$, and a second layer of a substance primarily consisting of $(Zn_{1-y}Cd_yTe)_{1-z}(In_2Te_3)_z$.

3. A photoconductor element as defined in claim 2, wherein said second layer consists of hetero junction having a layer of a substance primarily consisting of $(Zn_{1-y}Cd_yTe)_{1-z}(In_2Te_3)_z$ and another layer of a substance primarily consisting of $(ZnTe)_{1-v}(In_2Te_3)_v$, wherein $O < v < 1$.

4. A photoconductor element as defined in claim 2 wherein $x = 0.1$, $y = 0.3$ and $z = 0.05$.

5. A photoconductor element as defined in claim 3, wherein $x = 0.1$, $y = 0.3$, $z = 0.05$ and $v = 0.01$.

6. A photoconductor element as defined in claim 3, wherein $x = 0.1$, $y = 0.1$, $z = 0.05$ and $v = 0.01$.

* * * * *